Sept. 12, 1967   D. R. HERRIOTT   3,340,765
PROJECTION SYSTEM

Filed July 27, 1964                                       2 Sheets-Sheet 1

INVENTOR
D. R. HERRIOTT
BY
*C. E. Hirsch Jr.*
ATTORNEY

Sept. 12, 1967 D. R. HERRIOTT 3,340,765
PROJECTION SYSTEM
Filed July 27, 1964
2 Sheets-Sheet 2
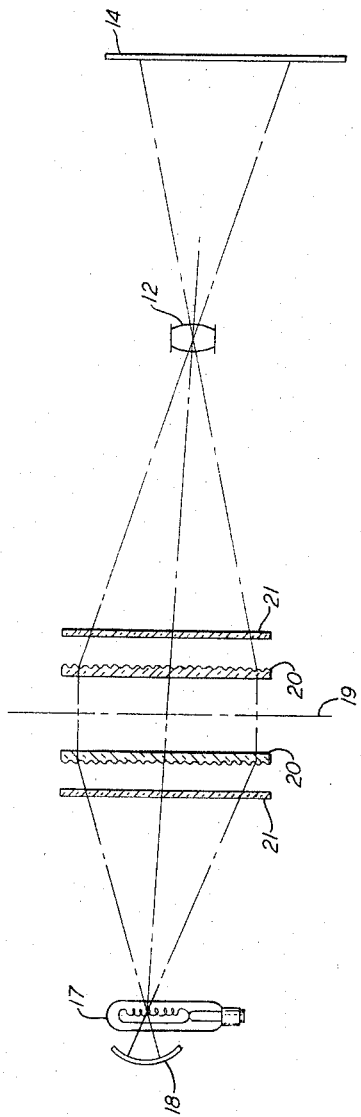
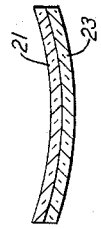
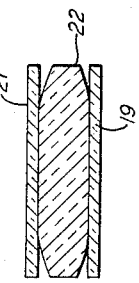
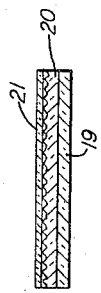

United States Patent Office 3,340,765
Patented Sept. 12, 1967

3,340,765
PROJECTION SYSTEM
Donald R. Herriott, Morris Township, Morris County, N.J., assignor to Bell Telephone Laboratories, Incorporated, New York, N.Y., a corporation of New York
Filed July 27, 1964, Ser. No. 385,136
2 Claims. (Cl. 88—24)

This invention pertains to optical projection systems and, more particularly, to apparatus for forming an optical image of a transparency on a displaced screen.

Projection systems of diverse sorts have been used in the past for classroom and conference presentation of material contained on transparent slides. For the most part, they are characterized by the formation of a real image which is intercepted by a receiving surface. A source of light of high intrinsic brightness is generally employed. Representative instruments of this type include lantern-slide and motion-picture projectors which form an image of a lantern slide or a motion-picture film on a projection screen. In one form of projector, a slide is mounted on a box-like container. Interior to the container is a light source and reflector for transmitting light through the slide or transparency. The rays of light which pass through the unmasked portions of the transparency are converged by a lens, and deflected by a reflecting surface to a displaced screen whereon an image of the writing or inscription appearing on the transparency is formed.

In certain circumstances it is desirable that an image of a transparency be formed which does not lend itself to illumination from a light source mounted behind the transparency. This is particularly true when the transparency must be mounted on a case containing ancillary electronic and mechanical equipment behind the slide mount. Alternative arrangements wherein above surface illumination of an opaque presentation of the material to be displayed, e.g., a paper writing surface, is utilized, are extremely inefficient due to diffusion of the reflected light. In a typical opaque projection system, the light available for illumination of the screen is one two-hundredth of that available with transparency projecting systems.

It is, therefore, a principal object of the present invention to display the light image of a transparency, efficiently, on a displaced screen.

Another object is to provide an efficient projection system utilizing a lens assembly which substantially reduces diffusion of reflected illumination.

Another object is to permit the efficient projection of a transparent display medium illuminated from the projected image side of the transparency.

These objects are accomplished in accordance with the present invention by the use of a tripartite optical assembly. A source of light, e.g., an incandescent lamp, illuminates a transparent surface whereon writing or analogous information is inscribed for display on a displaced screen. Incident light is transmitted by the transparency and is redirected back through the transparency by a reflecting surface. A thin lens, preferably of the Fresnel type, is inserted or sandwiched between the transparency and the reflecting surface to image the reflected light at a predetermined position. The use of the lens substantially reduces diffusion of the light thereby greatly increasing the efficiency of the system. Light rays transmitted by the transparency and incident on the lens are collimated, i.e., the rays emanating from the lens are aligned in parallel paths when incident on the reflecting surface. Upon reflection the rays are imaged by the Fresnel lens at a point adjacent to the source. A projection lens of any conventional construction may be placed at this focal point to project an image of the writing on the transparency to a viewing screen. The path of rays emanating from the projection lens may be directed toward the screen by means of an auxiliary reflecting surface.

These and further features and objects of this invention, its nature and various advantages will appear more fully upon consideration of the attached drawings and the following detailed description of the drawings.

In the drawings:

FIG. 2 is a ray diagram of the optical configuration illustrated in FIG. 1;

FIG. 4 is a sectional view of an efficient lens assembly, utilizing a Fresnel lens, constructed in accordance with the present invention;

FIG. 5 is a sectional view of an alternative lens assembly utilizing a double-convex converging lens; and FIG. 6 is a sectional view of an alternative lens assembly utilizing a segment of a spherical reflecting surface.

Like numeral designations are used throughout to identify like components.

Figure 1:
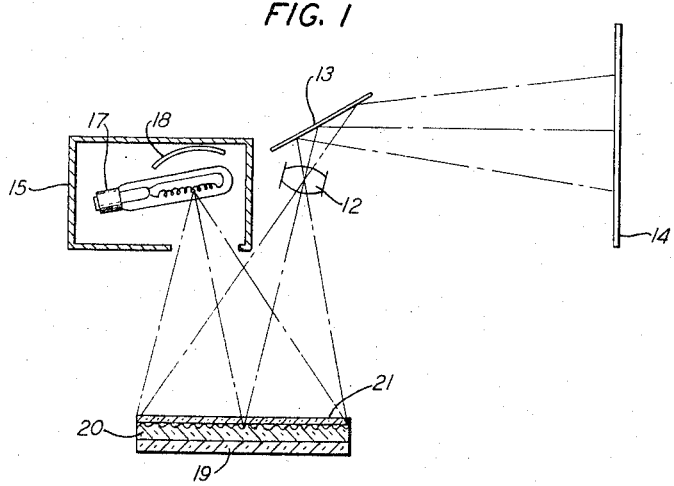
FIG. 1 is a diagram of an optical configuration in accordance with the present invention.

The projection system and lens assembly of the present invention find particular advantage when incorporated in a projector, for example, of the type illustrated in FIG. 1. The projector therein shown comprises a box-like light source container 15. Light source 17, e.g., an incandescent lamp, affixed therein, and reflector 18 provide a beam of light through an aperture in the container. The aperture delimits the area of transparent surface 21 to be projected to a distant screen 14. Rays emanating from light source 17 illuminate transparent surface 21. They pass through transparent surface 21 to a juxtaposed lens, such as a Fresnel lens 20, which collimates them. As a result, light is reflected at almost normal incidence by reflecting surface 19, contiguous to lens 20, and imaged by Fresnel lens 20 at a projection lens 12. Light rays emanating from projection lens 12 are diverted by reflecting surface 13 and displayed on screen 14.

Transparent surface 21 may comprise a slide or writing surface of a thickness approximating several thousandths of an inch. Fresnel lens 20 should, preferably, be as thin as possible to prevent double imaging; commercially available lens are suitable. Reflecting surface 19 may conveniently be any reflecting device, as for example, a mirror.

FIG. 2 illustrates the effective optical system shown in FIG. 1. Elements 19, 20, and 21 are shown separated for illustrative purposes. Light source 17 and reflector 18 illuminate transparency 21. Light transmitted through transparency 21 is collimated by lens 20 and reflected by surface 19. The effective position of surface 19 is shown by a sectional line. Reflected light is directed back through the Fresnel lens 20 and imaged on projection lens 12. Thus, any writing or similar inscription on transparent surface 21 is imaged on lens 12 and thereby displayed on screen 14. Lens 20 substantially reduces diffusion by focusing the reflected light, thereby greatly increasing the efficiency of the optical system.

Figure 3:
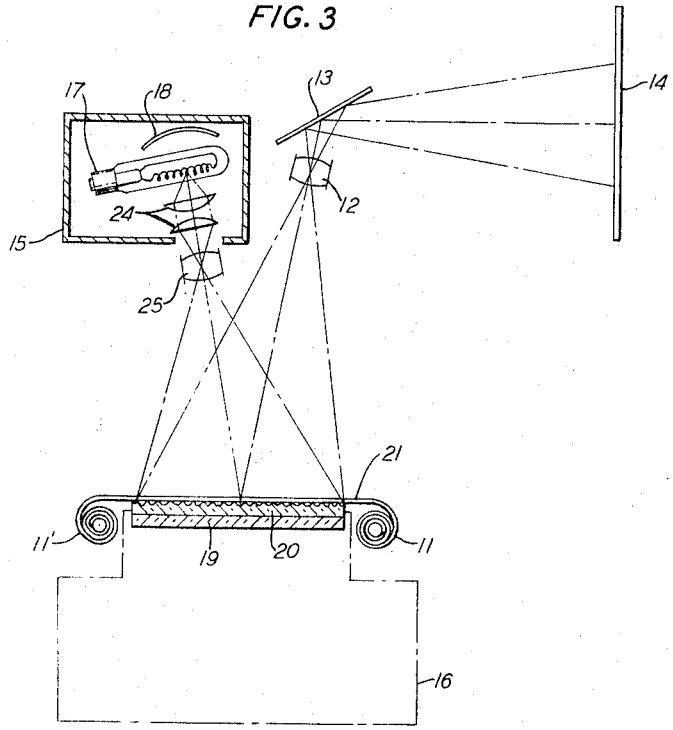
FIG. 3 is a diagrammatic view of an alternative embodiment of the present invention.

An alternative embodiment of the invention is illustrated in FIG. 3. A light source 17, e.g., an incandescent lamp, and reflector 18, mounted within a box-like container 15, illuminate a transparent member 21 via lenses 24 and 25. Lenses 24 and 25 comprise an optical configuration conventionally referred to as a projector. Light rays transmitted by transparency 21 are collimated by Fresnel lens 20 and reflected at almost normal incidence by surface 19, e.g., a mirror. The reflected light rays are imaged by lens 20 onto projection lens 12 whereon an image of the inscription appearing on transparent medium 21 is formed. Light rays emanating from projection lens 12 are deflected by reflector 13, e.g., a mirror, to a displaced screen 14. In this embodiment the light source is magnified by the optical configuration, lenses 24 and 25, substantially increasing the illuminated area of projection lens 12. In addition, the area of the transparency illuminated is more sharply defined thereby reducing scattered light.

The apparatus of this invention may be also used with ancillary equipment, illustrated by dashed line 16 in FIG. 3. The ancillary equipment may comprise apparatus responsive to transmitted electrical signals for reproducing writing or analogous material. Such apparatus, not a part of this invention, is well known and widely used in the communication art. A captive pen or similar instrument is ordinarily made to write on transparent surface 21 in response to applied control signals. Rollers 11 and 11' are conveniently placed for storing the used and unused portions of the transparent medium which may be a thin, transparent synthetic material. By the practice of this invention, information entered on the writing surface, previously visible only to immediate bystanders, is made immediately available to many classroom occupants or conference participants.

The tripartite optical assembly utilized in the present invention is more clearly depicted in FIG. 4. As shown therein, a Fresnel lens 20 is sandwiched between a transparent surface 21 and a reflecting surface 19. A Fresnel lens may be regarded as a plurality of lenses, the curvature of the back surface of each lens being so chosen as to eliminate spherical aberration. The Fresnel construction may be modified to distribute light in almost any desired manner. Since Fresnel lenses are comparatively thin, their weight is less than that of an ordinary lens and they absorb a relatively small amount of light.

Alternative lens arrangements are shown in FIGS. 5 and 6. In FIG. 5 a positive lens 22, illustratively shown as double convex, is utilized to redirect light rays transmitted by transparent surface 21 and reflected by surface 19. In FIG. 6 there is shown a transparent surface 21 mounted on a spherical reflecting surface 23. The curvature of the surface 23 is greatly exaggerated for the purpose of illustration. Generally, a radius approximately equal to one-half the sum of the respective distances of the source 17 and projection lens 12 from the surface 23 is satisfactory. In most circumstances the radius will approximate 15 inches thereby presenting a curvature which is hardly noticeable.

It is to be understood that the embodiments shown and described herein are illustrative and that further modifications of this invention may be implemented by those skilled in the art without departing from the scope and spirit of the invention. For example, if convenience so dictates, the lens and reflecting surface may be a unitary structure.

What is claimed is:

1. Optical apparatus for forming an optical image of a transparent surface comprising, in combination;
    a transparent member for providing an easily accessible writing surface,
    means for illuminating said transparent member,
    Fresnel lens means in contact with said transparent member and oppositely disposed from the illuminated side of said transparent member for collimating the incident light rays transmitted by said transparent member,
    reflection means in contact with said lens means for reflecting said collimated light rays,
    said lens means focusing said reflected collimated light rays in a direction different from that of said incident light rays,
    and projection means displaced from said illuminating means for intercepting reflected collimated light rays focused by said lens means.

2. Optical apparatus for forming an optical image of a transparent surface comprising, in combination;
    a transparent member for providing an easily accessible writing surface,
    means for illuminating said transparent member,
    Fresnel lens means in contact with said transparent member and oppositely disposed from the illuminated side of said transparent member for collimating the incident light rays transmitted by said transparent member,
    reflection means in contact with said lens means for reflecting said collimated light rays,
    said Fresnel lens means collimating incident light rays transmitted by said transparent member and focuses said collimated light rays, after reflection by said reflection means, in a direction different from that of said incident light rays,
    and projection means displaced from said illuminating means for intercepting reflected collimated light rays focused by said lens means.

References Cited

UNITED STATES PATENTS

| | | | |
|---|---|---|---|
| 2,407,680 | 9/1946 | Palmquist et al. | 40—136 X |
| 2,647,437 | 8/1953 | Bentley et al. | 88—24 X |
| 2,986,062 | 5/1961 | Willyard | 88—24 X |
| 3,051,041 | 8/1962 | Lehmann et al. | 88—1 X |
| 3,222,986 | 12/1965 | Altman | 88—24 |
| 3,285,126 | 11/1966 | Lucas | 88—24 |

NORTON ANSHER, *Primary Examiner.*

R. A. WINTERCORN, V. A. SMITH,
*Assistant Examiners.*